United States Patent [19]

Tamura et al.

[11] Patent Number: 5,027,877
[45] Date of Patent: Jul. 2, 1991

[54] OFF-THE-ROAD HEAVY DUTY PNEUMATIC RADIAL TIRE

[75] Inventors: Akira Tamura, Iruma; Masato Takenoya, Urawa; Toshifumi Ikuno, Kodaira, all of Japan

[73] Assignee: Bridgestone Corporation, Tokyo, Japan

[21] Appl. No.: 336,487

[22] Filed: Apr. 12, 1989

[30] Foreign Application Priority Data

Apr. 14, 1988 [JP] Japan ................................ 63-92799

[51] Int. Cl.$^5$ .............................................. B60C 9/18
[52] U.S. Cl. ................................... 152/527; 152/538
[58] Field of Search ............... 152/535, 527, 536, 531, 152/538, 527

[56] References Cited

U.S. PATENT DOCUMENTS 4,702,293 10/1987 Iwata et al. .................... 152/536 X

FOREIGN PATENT DOCUMENTS 54-153403 12/1979 Japan .
57-80908 5/1982 Japan .
60-185602 9/1985 Japan .................................. 152/531
63-38007 2/1988 Japan .................................. 152/535

Primary Examiner—Robert A. Dawson
Assistant Examiner—Geoffrey L. Knable
Attorney, Agent, or Firm—Sughrue, Mion, Zinn, Macpeak & Seas

[57] ABSTRACT

An off-the-road heavy duty pneumatic radial tire is suitable to be used on irregular grounds or roads. The tire includes a carcass of radially arranged cords and a belt of a plurality of rubber coated steel cords. The belt comprises a main layer of first, second and third layers whose cords in adjacent layers are arranged inclined reversely to each other with respect to an equatorial plane of the tire and a protective layer laminated on the main layers. Cords of the protective layer are high elongation cords whose tensile breaking elongation is 1.4 to 3.0 times that of the cords of the main layer of the belt. The second layer is narrower than the adjacent first layer and much narrower than the adjacent third layer. The protective layer extends wider than the widest third layer. Edges of the protective layer are on extensions of a center line of a total thickness of the main layers.

15 Claims, 4 Drawing Sheets

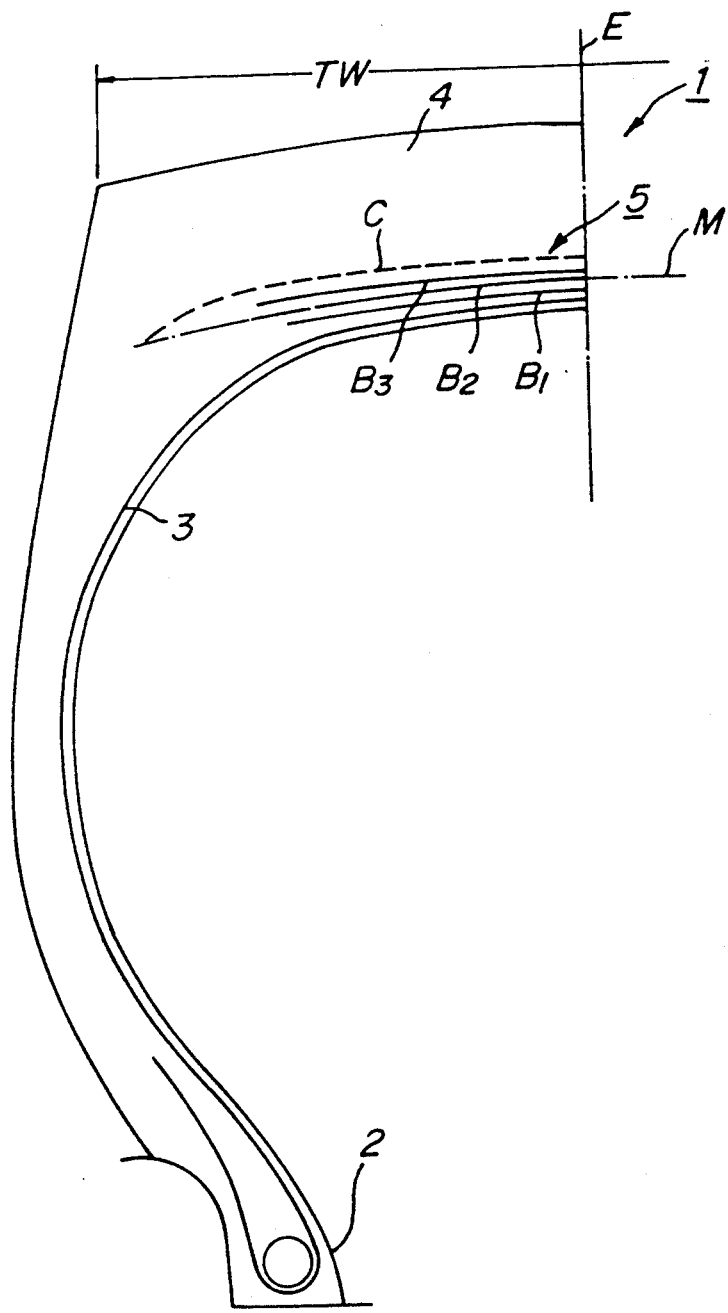

OFF-THE-ROAD HEAVY DUTY PNEUMATIC RADIAL TIRE

BACKGROUND OF THE INVENTION

This invention relates to an off-the-road heavy duty pneumatic radial tire to be used on large type heavy duty vehicles on off-road conditions such as irregular ground or roads which are rugged by various transportation or works such as building or construction sites or mines. More particularly it relates to an off-the-road heavy duty pneumatic radial tire whose durability is greatly improved.

With hitherto used heavy duty pneumatic radial tires, for the purpose of reinforcing a tread of the tire, there is in general provided a belt consisting of a number of layers made of rubber coated steel cords surrounding a crown portion of a carcass toroidally extending between a pair of beads of the tire.

In such a first type of the prior art tires, steel cords are used for the belt layers and are of $1 \times 3 + 9 + 15 + 1$ construction. The cord strength is of the order of 165 kg/one cord.

In this case, the layers of the belt are first, second, third, ... layers arranged in the order from a carcass side to a tread side. And among them, as illustrated in FIG. 1a, the widest second layer 5B is arranged on the first narrow layer 5A and the remaining layers 5C–5F are successively arranged on the second layer in a manner progressively reducing their widths. Therefore, imaginary lines connecting width edges of the respective layers form a V-shape in the form of a sharp wedge as shown in FIG. 1a.

Steel cords of the respective layers of the belt are at angles of about 21° with an equatorial plane of the tire. (The angles are designated by additional characters R where the cords extend from lower left side to upper right side viewed from the outside of the tire, and L where the cords extend from lower right side to upper left side.)

With such a simple belt construction, the belt exhibits a very high rigidity against tensile forces acting upon the belt when inflated because the many layers are used and the cords of the laminated layers, as much as six, intersect with each other in the adjacent layers although the cord strength itself is relatively low. Moreover, the rigidity of the belt is enhanced by the fact that the entire belt layers are like a high strength plate and the V-shaped imaginary lines connecting the width edges of the respective belt layers are in the wedge shape.

On the other hand, rigidity of the tread rubber between the carcass and the belt at its width edges is much less than that of the belt subjected to the tensile forces. As a result, when the tread is subjected to a load, stress concentration takes place at tip ends of the V-shaped wedges to cause great shearing strains in the tread rubber which would cause troubles of the tire such as cracks.

Since the first layer of the belt is narrow, moreover, the amount of the rubber between the first layer of the belt at its edges and the carcass is less than the amount of rubber between the second layer at its edges and the carcass. Therefore, when the tread is subjected to a load to deform together with the belt, the edges of the first belt layer are subjected to a much larger tensile stress to cause a large shearing stress acting upon the rubber between the edges of the first layer and the carcass facing to the edges. This results in separations and cracks between the edges of the first belt layer and the rubber and growth of the separations and cracks of the rubber along the outer surface of the carcass facing to the edges of the first belt layer.

In contrast herewith, in a second type of prior art tire illustrated in FIG. 1b, second and third belt layers 5B and 5C among first to fifth belt layers 5A–5E arranged in the order from a carcass to a tread side form main intersecting belt layers. All of the remaining belt layers are auxiliary layers as shown in FIG. 1b.

In this case, the main intersecting belt layers are arranged such that their steel cords intersect with each other and are inclined in opposite directions relative to an equatorial plane of the tire. Circumferential tensile forces caused in a tread of the tire are supported by the cords of the main intersecting belt layers.

The fourth and fifth layers 5D and 5E as the auxiliary layers are made of so-called "high elongation cords" having breaking tensile elongations more than 1.4 times those of steel cords of the other layers. On the other hand, the first layer 5A as the auxiliary layer is made of a pair of belt layers spaced apart from each other so that the first layer 5A does not exist at the center of the carcass.

Moreover, angles of steel cords of the respective layers of the belt with an equatorial plane of the tire are for example R 62°, R 40°, L 25°, R 25° and L 25° in the order from the carcass of the tread side. The cords of the main intersecting belt layers 5B and 5C are of $1 \times 3 + 9 + 15 + 1$ construction. The cord strength is of the order of 465 kg/one cord. The cords of the first layer of the belt are of $1 \times 3 + 9 + 15 + 1$ construction and cord strength of that layer is of the order of 280 kg/one cord.

With the second type of the prior art, imaginary lines connecting width edges of the layers except the fourth and fifth layers using the high elongation cords form a V-shaped wedge so that stress concentrations would occur in the same manner as with the first type of the prior art. Particularly, when the tread is subjected to a great force such as in the case that the tire rides over stones on a road, the main intersecting layers must support excessive tensile forces because the main intersecting layers are inherently two layers. Moreover, edges of the fourth layer made of the high elongation cords do not properly cover edges of the second layer so that the stress mitigating function is insufficient. Therefore, the tire of the second type is also prone to separations at the edges of the second layer.

In this case, moreover, as the main intersecting belt layers are only two layers, the first layer of the belt having a narrow width is obliged to support excessive tensile forces so that fatigue at the edges of the first layer is prematurely promoted resulting into trouble such as separations and cracks even in an initial period of use. As above described, moreover, since the first layer is narrower than the second layer, great shearing stresses act between the edges of the first layer and the carcass to cause troubles such as separations outside of the carcass as already explained.

In a third type of the prior art as illustrate in FIG. 1c, among first to sixth layers arranged in the order from a carcass to a tread side, the first, second, third and fourth layers 5A, 5B, 5C and 5D form main intersecting belts and the remaining fifth and sixth layers 5E and 5F are made of high elongation cords. The nature of the third type as a whole is intermediate between those of the first and second types above described.

Steel cords of the respective layers are alternately arranged at angles of R 23° and L 23° from a carcass to a tread side. All steel cords of the main intersecting belts are of 1×3+9+15+1 construction and cord strength is of the order of 165 kg/one cord.

With this arrangement of the tire of the third type, rigidity of the main intersecting belts is higher than that of the second type, although it is less than that of the first type. Imaginary lines connecting width edges of the respective layers form a V-shaped wedge in the same manner as in the first and second types. Therefore, when the tread is subjected to a great force such as in the case that the tire rides over stones on a road, the stress mitigating function of the fifth layer is insufficient because the fifth layer does not sufficiently cover edges of the second layer so that troubles such as separations and cracks are likely to occur. Moreover, there is a tendency for separations and cracks to occur resulting from separations at edges of the first layer.

SUMMARY OF THE INVENTION

It is a primary object of the invention to provide an improved off-the-road heavy duty pneumatic radial tire which prevents separations and cracks occurring at edges of a belt, particularly at edges of a first layer of the belt in traveling under a heavy load on off-the-roads such as uneven irregular grounds and particularly when the tire is subjected to great forces as a case that the tire rides over rocks or stones, and which enables to properly prevent separations and cracks at an outer surfaces of a carcass caused by development of the separations and cracks occurred at the edges of the belt.

The inventors of this case have investigated in various manners the stress and strain concentrations at edges of belts, behavior thereof causing separations and cracks and effective prevention thereof to obtain a belt construction for reinforcing a tread of a tire.

As a result, they have found that durability of the tire can be considerably improved by providing a function for uniformly distributing and mitigating stresses and strains at edges of main intersecting belts and providing a protecting layer using high elongation cords made of steel having a large elongation, thereby obtaining a double protecting function. Particularly, they have found that separations and cracks growing from edges of the innermost layer of the main intersecting belts along an outer surface of a carcass are caused by shearing stresses and strains between the belt and carcass plies caused by deformations of the edges of the belt supporting tensile forces and that a relationship between widths of the innermost layer and a layer adjacent thereto greatly affect the above shearing stresses and strains. The invention resides in the these discoveries.

From the above recognition, in an off-the-road heavy duty pneumatic radial tire including a carcass toroidally extending between a pair of beads and having radially arranged cords and a belt of a plurality of layers made of rubber coated steel cords surrounding a crown portion of said carcass, according to the invention the belt comprises main layers of at least three layers whose cords in adjacent layers are arranged inclined reversely to each other with respect to an equatorial plane of the tire and a protective layer laminated on and encircling said main layers, cords of the protective layer being high elongation cords whose tensile breaking elongation is 1.4 to 3.0 times that of the cords of the main layers of the belt, and further among first, second and third layers of the main layers in the order from the carcass to a tread of the tire, the second layer is narrower than the adjacent first layer and much narrower than the adjacent third layer and said protective layer extends wider than the widest third layer, edges of the protective layer being on extensions of a center line of a total thickness of the main layers.

In this case the main layers includes a fourth layer arranged radially outwardly of the third layer and having a width at least substantially equal to a width of the second layer.

Moreover, cords of the fourth layer are inclined in directions substantially the same as those of cords of the second layer, such that tensile forces acting upon the belt from inflation pressure are distributed by supporting of the main layers whose cord intersect each other.

According to the invention, widths of the first, second and third layers of the main layers are in ratios to a width TW (1.00) of the tread within ranges of 0.55 to 0.75, 0.45 to 0.65 and 0.65 to 0.85, respectively and a width of the protective layer is in the ratio within a range of 0.75 to 1.00. Moreover, inclined angles of the cords of the main layers and the protective layer with respect to an equatorial plane of the tire are within a range of 15° to 30°.

It is necessary that tensile breaking elongation of the steel cords of the main layers are within a range of 1.9% to 3.0%, and tensile breaking elongations of the high elongation cords of the protective layer are within a range of 1.4 to 3.0 times, preferably 1.7 to 2.5 times the tensile breaking elongation of the steel cords of the main layers.

The extension of the center of the total thickness of the main layers may be, for example, approximately a circular arc passing through centers of the main layers at on the equatorial plane and at edges of the narrowest second layer.

In order that the invention may be more clearly understood, preferred embodiments will be described, by way of example, with reference to the accompanying drawings.

BRIEF DESCRIPTION OF THE DRAWINGS

FIG. 2 is a sectional view of one embodiment of the tire according to the invention;

DETAILED EXPLANATION OF PREFERRED EMBODIMENTS

Figure 3:
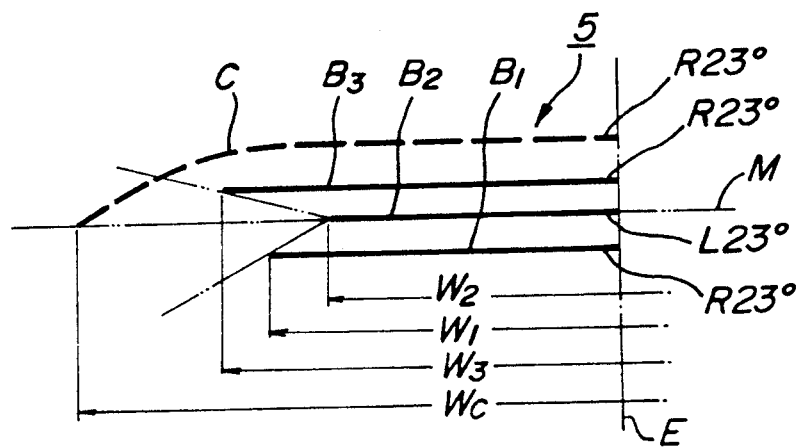
FIG. 3 is a schematic view illustrating a skeleton of the tire shown in FIG. 2.
Figure 4A:
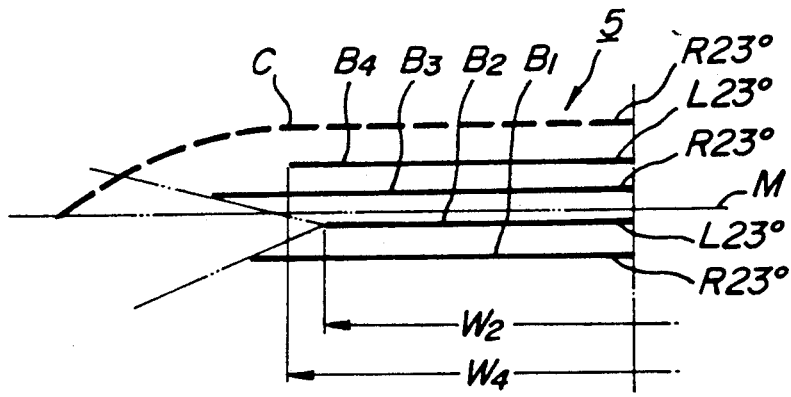
FIGS. 4a, 4b and 4c are schematic views illustrating skeletons of tires of other embodiments of the invention.
Figure 4B:
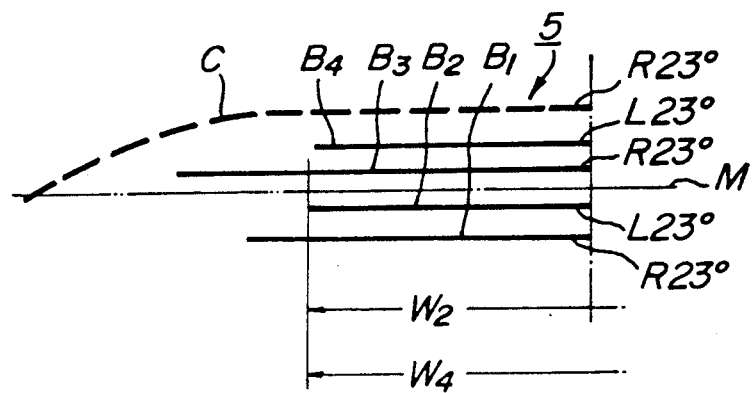
Figure 4C:
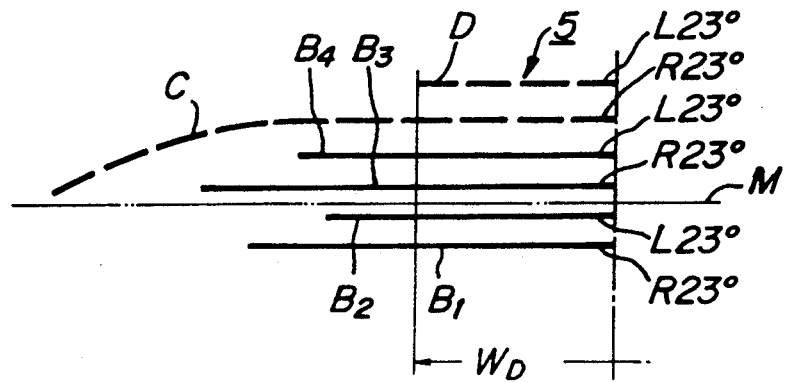

FIG. 2 illustrates an off-the-road heavy duty pneumatic tire in section comprising a tread reinforcement by forming a belt including three main layers $B_1$, $B_2$ and $B_3$ made of rubber coated steel cords and a single (in this embodiment) protective layer C made of rubber coated high elongation cords according to the invention. FIG. 3 schematically illustrates an arrangement of laminated belts. FIGS. 4a, 4b and 4c illustrate other arrangements of laminated belt layers according to the invention.

In the drawings, the tire 1 includes beads 2, a carcass 3, a tread 4 and a belt 5.

In the embodiment shown in FIG. 3, arrangements of cords of the main layers $B_1$, $B_2$ and $B_3$ of the belt 5 are R 23°, L 23° and R 23°. Cords of the protective layer C are of R 23°. On the other hand, in the embodiments shown in FIGS. 4a and 4b, a layer $B_4$ of L 23° is provided between the main layer $B_3$ and a protective layer C. In the embodiment shown in FIG. 4c, a further narrow protective layer D is provided.

According to the invention, the belt 4 comprises the main layers $B_1$, $B_2$ and $B_3$, and further $B_4$ as the case may be, and comprises the protective layer C, and further D as the case may be. Moreover, a relation between these layers is that $W_C > W_3 > W_1 (> W_4) \geq W_2 > W_D$. The protective layer C has a width such that edges of the arranged protective layer C are located on an extension of a center line M (shown in chain liens in these drawings) of a total thickness of all the main layers $B_1$, $B_2$ and $B_3$ (and $B_4$).

According to the invention, steel cords of the adjacent layers of the main layers are inclined reversely with respect to an equatorial plane of the tire to intersect with each other, and the width $W_2$ of the second layer $B_2$ is the narrowest of the first layer $B_1$ to the third or fourth layer $B_3$ or $B_4$. With this arrangement, even if the main layers are subjected to an excessive force at edges of the first and third layers $B_1$ and $B_3$ embracing the second layer $B_2$ through a tread 4, the main layers exhibit the stress mitigating function as a self-protecting performance because comparatively free deformation toward the center line M of the total thickness of the main layers is possible.

Moreover, the high elongation steel cords used for the protective layer C are likely to be elongated and inclined at the same angles as those of the first and third layers $B_1$ and $B_2$. And the protective layer C covers the entire main layers and has its edges located in particular positions. Therefore, the forces acting upon the edges of the third layer $B_3$ are mitigated and at the same time the stress concentration at the edges of the protective layer C is also mitigated so that sufficient durability of the tire is obtained.

In this case, the term "particular positions" of the edges of the protective layer C is intended to mean those which are on the extension of the center line M of the total thickness of the main layers of the belt and not outside of the width TW (FIG. 2) of the tread. These positions substantially remain unchanged even if all the belt layers are bending deformed due to the deformation of the tread subjected to a load, so that the stress concentration does not take place.

Furthermore, since the width $W_1$ of the first layer $B_1$ is more than the width $W_2$ of the second layer $B_2$, it is possible to increase the spaces between the edges of the first layer $B_1$ and the carcass so as to enable the rubber therebetween to be thicker. In addition thereto, intersecting zones of the steel cords of the first and second layers $B_1$ and $B_2$ are spaced from the edges of the first layer $B_1$ nearest to the carcass 3. As a result, the shearing stresses between the carcass 3 and the edges of the first layer $B_1$ due to changes in steel cord angle at the edges of the first layer $B_1$ when being loaded are considerably reduced. Therefore, the separation and cracks at the edges of the first layer $B_1$ and on the outer surface of the carcass 3 are simultaneously prevented.

Moreover, the steel cords of the third and first layer $B_3$ and $B_1$ are inclined in the same directions and the third layer $B_3$ is arranged widely sufficient to cover the edges of the first layer $B_1$. Therefore, the force applied to the first layer $B_1$ from the tread is restrained by the third layer $B_3$ suitably protecting the edges of the first layer $B_1$ and the force acting upon the second layer $B_2$ at edges of the belt is mitigated because of the third layer $B_3$ together with the first layer $B_1$ supporting the force applied from the outside.

According to the invention, tensile breaking elongations of the high elongation steel cords used in the protective layer C are within a range of 1.4 to 3.0 times those of the steel cords used in the main layers. If the tensile breaking elongations of the high elongation steel cords are less than 1.4 times those of the main layers, the reduction of stresses expected by the protective layer C cannot be accomplished. On the other hand, in the event of excessive elongations of the cords of the protective layer C more than 3 times those of the main layers, the protecting function for the main layers does not sufficiently take place.

Actual tires of size 18.00 R 25 will be explained, to which the invention explained referring to FIGS. 2 and 3 is applied.

In this case, a belt 5 include a main layer having first, second and third layers $B_1$, $B_2$ and $B_3$, and a protective layer C covering the main layer radially outwardly.

Each of the main layers $B_1$, $B_2$ and $B_3$ comprises rubber coated steel cords of $7 \times 7 + 1$ and having a strength of 555 kg/one cord and a tensile breaking elongation of 2.8%.

On the other hand, the protective layer C comprises steel cords of $3 \times 7$ and having a strength of 180 kg/one cord and a tensile breaking elongation of 5.5% which is 1.96 times the tensile breaking elongation of the cords of the main layers.

The main layers $B_1$, $B_2$ and $B_3$ are arranged such that the steel cords of the adjacent layers are inclined at opposite angles with respect to an equatorial plane of the tire. The cords of the main layers $B_1$, $B_2$ and $B_3$ are arranged in R 23°, L 23° and R 23°, respectively. The cords of the protective layer C are arranged in R 23°.

Moreover, widths $W_1$, $W_2$ and $W_3$ and $W_C$ of the main layers $B_1$, $B_2$ and $B_3$ and the protective layer C are 0.63, 0.49 and 0.74 and 0.85 times a width TW of a tread 16, respectively.

Therefore, imaginary lines connecting the width edges of the main layers $B_1$, $B_2$ and $B_3$ form a V-shape in the form of a wedge diverging outwardly of the belt 5 as shown in FIG. 3, so that rigidities at the edges of the main layers are reduced. Moreover, the cords of the third and first layers $B_3$ and $B_1$ extend in the same directions and the edges of the third layers $B_3$ are covered by the first layer $B_1$. Accordingly, the third layer $B_3$ effectively protects the edges of the first layer $B_1$ from the force acting upon the tread when traveling, while the forces acting upon the steel cords of the respective layers are distributed onto the first and third layers $B_1$ and $B_3$ to considerably reduce the forces at the edges of the second layer $B_2$. As a result, stresses causing strains are reduced so that the main layers, themselves of the belt 5 exhibit a protecting function for the edges of the belt with the result that separations and cracks are prevented to a great extent.

In addition, the width $W_1$ of the first layer $B_1$ is wider than the width $W_2$ of the second layer $B_2$ and the edges of the first layer Bare spaced from the intersecting zones of the cords of the first and second layers $B_1$ and $B_2$ so that the rubber interposed between the edges of the first layer $B_1$ and the carcass 3 can be made thicker. Therefore, the shearing stresses and strains on the outer surface 13a of the carcass 3 in the proximity of the edges of the first layer $B_1$ are reduced to prevent occurrence and growth of separations and cracks.

Since the protective layer C covers the first and third layers $B_1$ and $B_2$ and terminates in the extensions of the center line M (actually plane) of the total thickness of the main layers as shown in FIG. 3, the force acting upon the edges of the third layer $B_3$ is reduced and the stress concentration at the edges of the protective layer C is considerably reduced in conjunction with the large elongation of the cords. The durability of the tire is thus greatly improved.

FIG. 4a illustrates a second embodiment of the tire according to the invention. In this embodiment, a main belt layer consists of four layers, first, second, third and fourth layers $B_1$, $B_2$, $B_3$ and $B_4$ arranged from a carcass side in order to meet a large type heavy duty pneumatic radial tire.

Cords of the fourth layer $B_4$ are arranged in L 23° and a width of the arranged fourth layer $B_4$ is narrower than that of the arranged first layer $B_1$ but slightly wider than that of the arranged second layer $B_2$.

In this arrangement, tensile forces acting upon the belt can be supported by and distributed on the first to fourth layers.

All the steel cords of the main layers are of $7 \times 7 + 1$ construction and have a strength of 400 kg/one cord and a tensile breaking elongation of 2.5%.

Steel cords of the protective layer C which are substantially the same as those in the first embodiment are of $3 \times 7$ construction and have a strength of 180 kg/one cord and a tensile breaking elongation of 5.5% which is 2.2 times that of the cords of the main layers. The construction of the second embodiment other than those described herein is substantially the same as that of the first embodiment.

FIG. 4b illustrates a third embodiment of the invention. The construction of the third embodiment is substantially the same as that of the second embodiment with exception that a width $W_4$ of an arranged fourth layer $B_4$ is substantially equal to a width $W_2$ of an arranged second layer $B_2$.

FIG. 4c illustrates a fourth embodiment of the invention. The construction of the fourth embodiment is substantially the same as that of the second embodiment with exception that a reinforcing layer D which is the narrowest among all layers and arranged radially outwardly of a protective layer C in order to improve the cut-resistant property of a tread. The reinforcing layer D comprises high elongation cords which are substantially the same as those of the protective layer C and arranged inclined in L 23° in a manner to intersect the cords of the protective layer C.

Figure 1A:
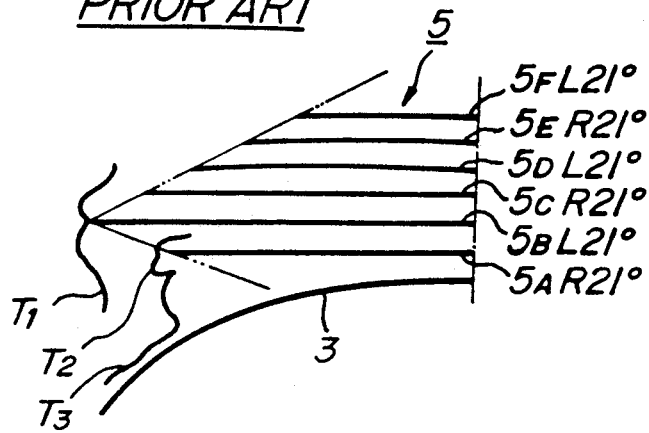
FIGS. 1a, 1b and 1c are schematic views illustrating skeletons of tires of first, second and third types of the prior art.
Figure 1B:
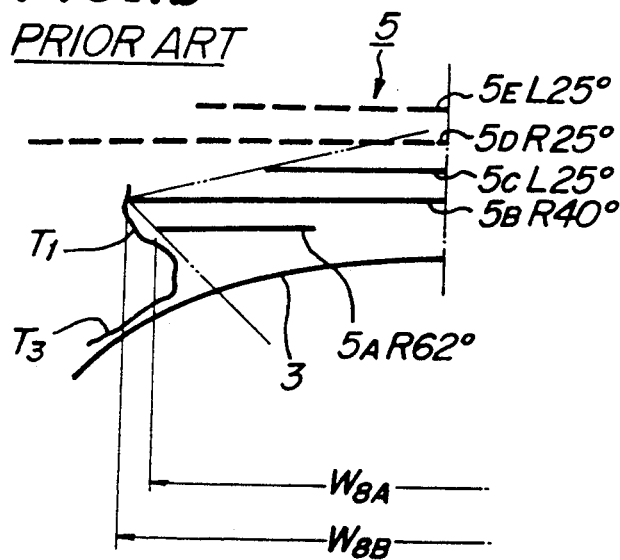
Figure 1C:
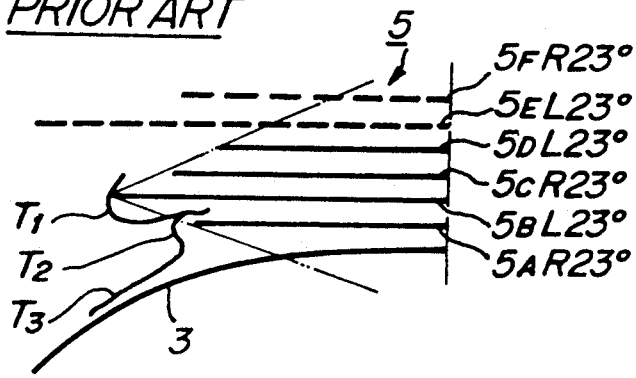

The inventors prepared tires of the first and second embodiments above described and tires of the prior art shown in FIGS. 1a, 1b and 1c as comparative examples to ascertain the effects of the invention in a comparative test.

Constructions of belts of the comparative examples 1 to 3 correspond to those of the first to third types of the prior art shown in FIGS. 1a–1c (exemplarily illustrating occurrence of separations and cracks by $T_1$, $T_2$ and $T_3$).

In testing, a drum testing machine in a room was used, whose rotating drum drove the tires forced against it. Two tires were assembled on normal rims and were filled with normal inner pressure. The test was carried out under a durability test condition causing failures at edges of belts or in the proximity thereof by the action of stresses and strains without raising the temperature in the proximity of locations where the belts were disposed. In other words, the tires were driven as so-called "breaking in" under 80% of normal load for one hour for the purpose of removing residual stresses and strains in the tires and thereafter the tires were driven under normal load for one hour and then rest for one hour. The driving and rest of the tires were repeated in this manner under so-called "on-and-off" running condition.

Running speeds were constant, 16 km/h. The load was progressively increased in increments of 10% of the normal load every running for one hour, which is referred to as "step load" system.

Judgment of the failures was effected by eyes during the rest of the tires. "Bulges" of signs or indications of separations and cracks were detected to compare loads and rolled or run distances when the bulges occurred.

Mean values of results of the test are shown in Table I are percentages of the normal load and indexes of run distances are percentages of the run distance of the comparative example 1 which is an index 100. As these values are larger, the tires are better in their performance.

As can be seen from Table I, with the tires according to the invention, separations and cracks at edges of the belts or in the proximity thereof and along outer surfaces of the carcass are effectively prevented to a considerable extent so that durability of the tires is remarkably improved.

According to the invention, even when large

TABLE I

| | Kind of tire | | | | |
| --- | --- | --- | --- | --- | --- |
| Item | Embodiment 1 of the invention | Embodiment 2 of the invention | Comparative example 1 | Comparative example 2 | Comparative example 3 |
| Load when bulged (%) | 220 | 210 | 190 | 180 | 190 |
| Index of run distance | 143 | 129 | 100 | 79 | 100 | forces act on treads during traveling on off-the-roads as when the tires ride over rocks or the like, separations and cracks starting from edges of the belts and progressing along surfaces of the carcasses are prevented to a great extent so that the durability of the tires is remarkably improved.

It is further understood by those skilled in the art that the foregoing description is that of preferred embodiments of the disclosed tires and that various changes and modifications may be made in the invention without departing from the spirit and scope thereof.

What is claimed is:

1. An off-the-road heavy duty pneumatic radial tire comprising: a carcass toroidally extending between a pair of beads and having radially arranged cords, a belt of a plurality of layers made of rubber coated steel cords surrounding a crown portion of said carcass, said belt comprises main layers of at least three layers whose cords in adjacent layers are arranged as inclined reversely to each other with respect to an equatorial plane of the tire and a protective layer laminated on and encircling said main layers, cords of the protective layer comprising high elongation steel cords whose tensile breaking elongation is 1.4 to 3.0 times that of the cords of the main layers of the belt, and including first, second and third layers of the main layer in that order from the carcass to a tread of the tire, wherein the total width of the second layer is less than the total width of the first layer and the total width of the first layer is less than the total width of the third layer and said protective layer has a greater total width than the third layer, and lateral edges of the protective layer are located on a center line bisecting the total thickness of the main layers.

2. A tire as set forth in claim 1, wherein said main layers include a fourth layer arranged radially outwardly of the third layer and having a width at least substantially equal to a width of the second layer and narrower than the first layer.

3. A tire as set forth in claim 2, wherein cords of the fourth layer are inclined in directions substantially the same as those of cords of the second layer.

4. A tire as set forth in claim 1, wherein widths of the first, second and third layers of the main layers are in ratios of a width of the tread within ranges of 0.55 to 0.75, 0.45 to 0.65 and 0.65 to 0.85, respectively and a width of the protective layer is in the ratio within a range of 0.75 to 1.00.

5. A tire as set forth in claim 1, wherein inclined angles of the cords of the main layers and the protective layer with respect to the equatorial plane of the tire are within a range of 15° to 30°.

6. A tire as set forth in claim 1, wherein tensile breaking elongations of the steel cords of the main layers are within a range of 1.9% to 3.0%, and tensile breaking elongations of the high elongation steel cords of the protective layer are within a range of 1.4 to 3.0 times the tensile breaking elongations of the steel cords of the main layers.

7. A tire as set forth in claim 6, wherein tensile breaking elongations of the high elongation steel cords of the protective layer are within a range of 1.7 to 2.5 times the tensile breaking elongations of the steel cords of the main layers.

8. A tire as set forth in claim 1, wherein said belt further comprises an additional protective layer arranged radially outwardly of the protective layer, said additional protective layer being narrower than the second layer and cords of said additional protective layer being high elongation steel cords.

9. A tire as set forth in claim 1, wherein inclination angles of the cords of the main layers are all equal.

10. A tire as set forth in claim 9, wherein an inclination angle of cords of said protective layer is equal to inclination angles of cords of said main layers.

11. A tire as set forth in claim 1, wherein an inclination direction of the cords of one layer of said main layers are opposite to inclination directions of cords of an adjacent layer.

12. A tire as set forth in claim 11, wherein an inclination direction of cords of said protective layer is opposite to an inclination direction of cords of an adjacent layer of said main layers.

13. A tire as set forth in claim 8, wherein an inclination angle of said additional protective layer is substantially equal to an inclination angle of said main layers.

14. A tire as set forth in claim 8, wherein an inclination angle of said additional protective layer is substantially equal to an inclination angle of said protective layer.

15. A tire as set forth in claim 14, wherein an inclination direction of cords of said additional protective layer is opposite that of cords of said protective layer.

* * * * *